(12) United States Patent
Kamparaju et al.

(10) Patent No.: US 12,537,426 B2
(45) Date of Patent: Jan. 27, 2026

(54) ELECTRICAL MACHINE AND METHOD OF OPERATING ELECTRICAL MACHINE

(71) Applicant: GE AVIATION SYSTEMS LLC, Grand Rapids, MI (US)

(72) Inventors: Suresh Babu Kamparaju, Bengaluru (IN); Balamurugan Sridharan, Bengaluru (IN); Shubham Sharma, Bengaluru (IN); Xiaochuan Jia, Dayton, OH (US)

(73) Assignee: GE AVIATION SYSTEMS LLC, Grand Rapids, MI (US)

( * ) Notice: Subject to any disclaimer, the term of this patent is extended or adjusted under 35 U.S.C. 154(b) by 231 days.

(21) Appl. No.: 18/364,841

(22) Filed: Aug. 3, 2023

(65) Prior Publication Data
US 2025/0047173 A1  Feb. 6, 2025

(51) Int. Cl.
| | |
|---|---|
| *H02K 11/33* | (2016.01) |
| *B64D 27/24* | (2006.01) |
| *H02K 7/18* | (2006.01) |
| *H02K 11/00* | (2016.01) |
| *H02K 11/21* | (2016.01) |
| *H02K 17/42* | (2006.01) |

(52) U.S. Cl.
CPC ............. *H02K 11/33* (2016.01); *B64D 27/24* (2013.01); *H02K 7/1823* (2013.01); *H02K 11/0094* (2013.01); *H02K 11/21* (2016.01); *H02K 17/42* (2013.01)

(58) Field of Classification Search
CPC .... H02K 11/33; H02K 11/21; H02K 11/0094; H02K 7/1823; H02K 17/42; B64D 27/24
See application file for complete search history.

(56) References Cited

U.S. PATENT DOCUMENTS

| | | | |
|---|---|---|---|
| 5,418,412 A | 5/1995 | Brucker | |
| 5,481,161 A | 1/1996 | El-Hamamsy et al. | |
| 6,462,429 B1 | 10/2002 | Dhyanchand et al. | |
| 8,030,788 B2 | 10/2011 | Xu et al. | |
| 10,833,616 B1* | 11/2020 | Silverstein | H02P 9/008 |
| 11,444,609 B2 | 9/2022 | Kuznetsov et al. | |
| 2002/0047455 A1* | 4/2002 | Dhyanchand | F02N 11/04 |
| | | | 310/211 |
| 2004/0027078 A1* | 2/2004 | Xu | F02C 7/268 |
| | | | 318/107 |
| 2013/0016546 A1* | 1/2013 | Mountain | H02P 9/48 |
| | | | 363/127 |

(Continued)

FOREIGN PATENT DOCUMENTS

| | | |
|---|---|---|
| CN | 105529975 A | 4/2016 |
| CN | 114865847 B | 3/2023 |

(Continued)

*Primary Examiner* — Sean Gugger
(74) *Attorney, Agent, or Firm* — Thomas | Horstemeyer, LLP

(57) ABSTRACT

An electrical machine comprising a rotatable shaft; an induction generator mechanically coupled to the rotatable shaft and defining a power output connectable with an electrical load, wherein the power output defines a desired constant voltage output; a converter electrically connected with the power output; and a controller connected to the converter, the controller configured to at least one of provide supplemental power at the power output or absorb excess power at the power output.

19 Claims, 6 Drawing Sheets

(56) References Cited

U.S. PATENT DOCUMENTS

2018/0191281 A1    7/2018  Zhong
2021/0384853 A1*  12/2021  Huang .................. B64D 33/00
2023/0179130 A1*  6/2023  Seagren .................... H02P 9/08
                                                          322/28

FOREIGN PATENT DOCUMENTS

GB        1369844 A    10/1974
JP       2005218229 A    8/2005

* cited by examiner

(12) United States Patent
US 12,537,426 B2

ELECTRICAL MACHINE AND METHOD OF OPERATING ELECTRICAL MACHINE

TECHNICAL FIELD

The disclosure relates to a method and apparatus for operating an electrical machine and more specifically to operating the electrical machine in response to receiving a varying power demand.

BACKGROUND

Electrical machines, which can include electrical generators, are used in energy conversion. In the aircraft industry, an electrical machine can be mechanically coupled to a source of rotation, such as a mechanical or electrical machine, which for some aircraft may include a gas turbine engine. The generator can convert the mechanical energy of rotation into electrical energy.

DETAILED DESCRIPTION

Figure 1:
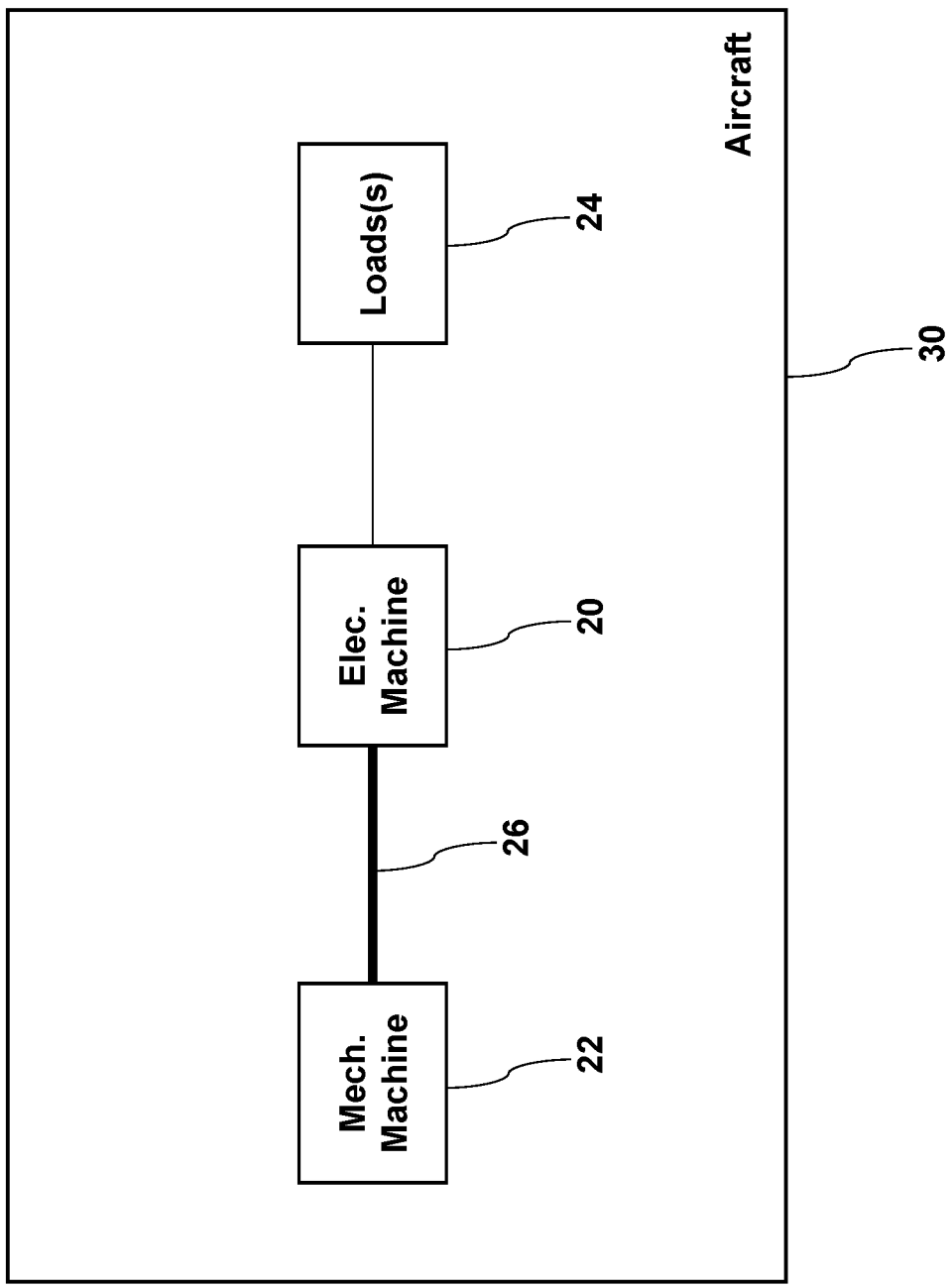
FIG. 1 is a schematic view of an aircraft including an electrical machine, in accordance with various aspects described herein.

Aspects of the present disclosure are described herein in the context of a power generation source for an aircraft, including an alternating current (AC) power generation source, which enables production of electrical power from an energy source such as a turbine engine, jet fuel, hydrogen, batteries, etc. However, it will be understood that the disclosure is not so limited and has general applicability to power distribution systems or power generation systems (collectively, "power distribution systems" hereafter) in non-aircraft applications, including other mobile applications and non-mobile industrial, commercial, and residential applications. For example, applicable mobile environments can include an aircraft, spacecraft, space-launch vehicle, satellite, locomotive, automobile, etc. Commercial environments can include manufacturing facilities or power generation and distribution facilities or infrastructure.

Electrical machines can be designed, sized, or otherwise controllably to generate an estimated, determined, predicted, or otherwise expected amount or quantity of electrical power to provide to a set of electrical loads. Over a period of time, a set of electrical loads can have varying power demands, which can include existing loads turning on or off, new loads being added, and existing loads being removed. In some instances, the modified expected amount of quantity of electrical power to be generated to meet the modified power demand of the updated set of electrical loads can result in an overall higher or lower power demand for an electrical machine. Aspects of the disclosure can be included wherein, while the set of electrical loads and modified power demand can vary over a period of time for the power distribution system, the power generation capabilities of the electrical machine can controllably and quickly accommodate the modified power demanded.

Additionally, in the presence of modified or altered power demands from a set of electrical loads, it is understood that the modified or altered power demands can result in voltage transients that are desired to be managed by the electrical machine. Compensating for a voltage transient is desirable, but can be difficult to quickly accomplish based on the operational response of a generator.

As used herein, the term "set" or a "set" of elements can be any number of elements, including only one. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

Additionally, while terms representative of electrical characteristics such as "voltage", "current", and "power" can be used herein, it will be evident to one skilled in the art that "electrical characteristic" terms can be interrelated when describing aspects of the electrical circuit, or circuit operations.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example electrical machine connections or disconnections can be enabled or operated by way of switching, bus tie logic, or any other connectors configured to enable or disable the energizing of electrical loads downstream of the bus. Additionally, as used herein, "electrical connection" or "electrically coupled" can include a wired or wireless connection. The exemplary drawings are for purposes of illustration only and the dimensions, positions, order and relative sizes reflected in the drawings attached hereto can vary.

Additionally, as used herein, a "controller" or "controller module" can include a component configured or adapted to provide instruction, control, operation, or any form of communication for operable components to effect the operation thereof. A controller can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), proportional resonant controller (PR), a hardware-accelerated logic controller (e.g. for encoding, decoding, transcoding, etc.), the like, or a combination thereof. Non-limiting examples of a controller can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein. In another non-limiting example, a controller can be configured for comparing a first value with a second value, and operating and controlling operations of additional components based on the satisfying of that comparison. For example, when a sensed, measured, or provided value is compared with another value, including a stored or predetermined value, the satisfaction of that comparison can result in actions, functions, or operations controllable by the controller. As used, the term "satisfies" or "satisfaction" of the comparison is used herein to mean that the first value satisfies the second value, such as being equal to or less than the second value, or being within the value range of the second value. It will be understood that such a determination may easily be altered to be satisfied by a positive/negative comparison or a true/false comparison. Example comparisons can include comparing a sensed or measured value to a threshold value or threshold value range.

As used herein, a controllable switching element, or a "switch" can include an electrical device that can be controllable to toggle between a first mode of operation, wherein the switch is "closed" intending to transmit current from a switch input to a switch output, and a second mode of operation, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Aspects of the disclosure can include an aircraft power system architecture, which enables production of electrical power from at least one spool of a turbine engine, such as a gas turbine engine, and delivers the electrical power to a set of electrical loads. An exemplary implementation can include a field-effect transistor (FET) switch, such as a metal-oxide-semiconductor field effect transistor (MOSFET) switch, which can be controlled by an applied voltage on the switch. Additional switching devices or additional silicon-based power switches can be included.

Aspects of the disclosure can be implemented in any environment using an electrical machine or power generator. Further, while this description is primarily directed toward an aircraft environment, aspects of the disclosure are applicable in any environment using an electrical machine.

The exemplary drawings are for purposes of illustration only and the dimensions, positions, order and relative sizes reflected in the drawings attached hereto can vary.

As generally illustrated in FIG. 1, an electrical machine 20 can be operably coupled with a mechanical machine 22 and electrically coupled to an electrical load or set of loads 24. For example, a rotatable shaft 26 of the electrical machine 20 can be operably coupled to the mechanical machine 22 such that operation of the mechanical machine 22 causes rotation of the rotatable shaft 26. In some configurations, the electrical machine 20 is included with an aircraft 30, the mechanical machine 22 includes a gas turbine engine of the aircraft 30, the gas turbine engine has an accessory gear box (AGB), and the rotatable shaft 26 is coupled with the gas turbine engage via the accessory gear box. A gas turbine engine can include a turbofan engine, such as a General Electric GEnx or CF6 series engine, commonly used in modern commercial and military aviation or it could include a variety of other known gas turbine engines such as a turboprop or turboshaft. Additionally or alternatively, the mechanical machine 22 can include a prime mover separate from or in addition to a gas turbine engine.

Figure 2:
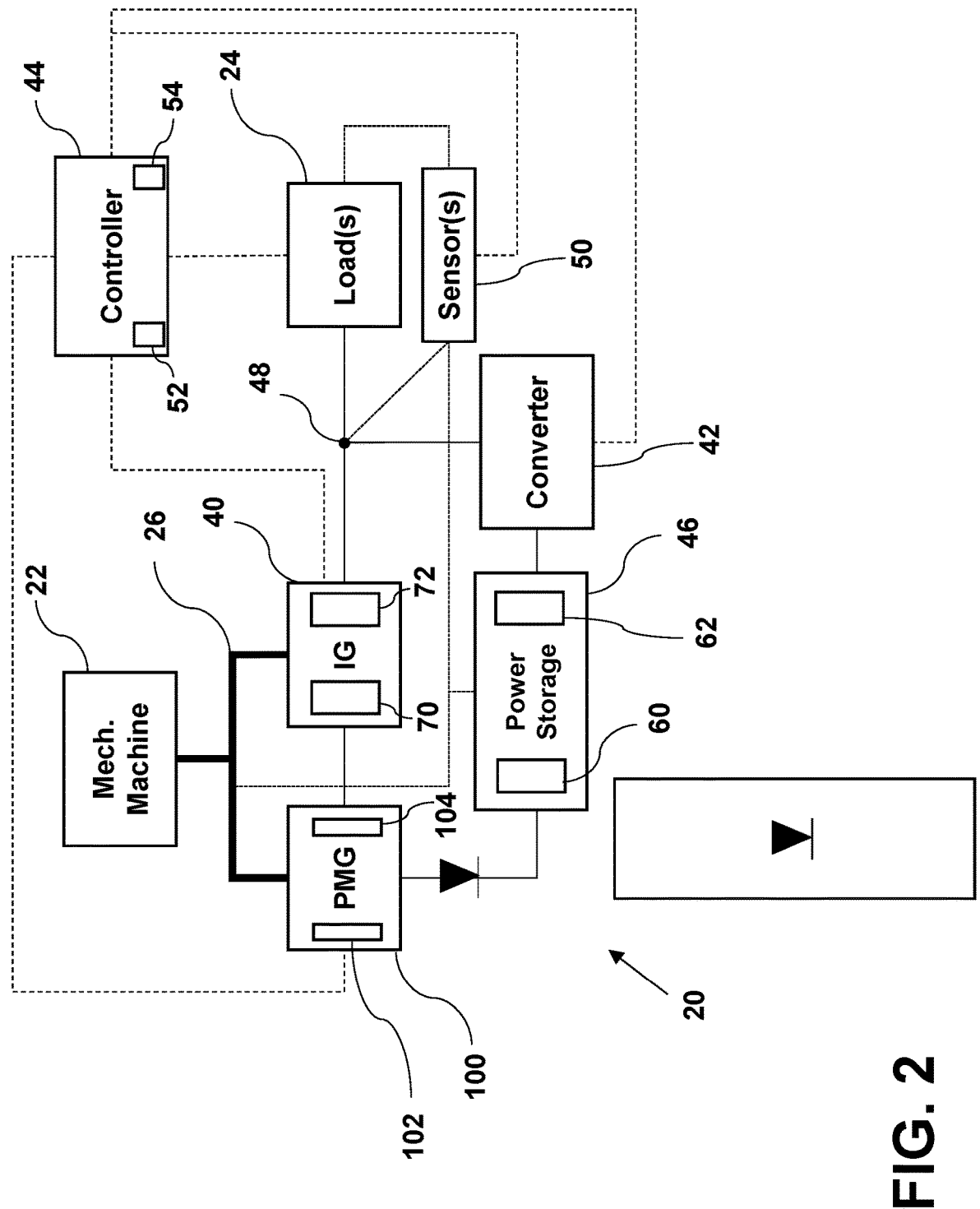
FIG. 2 is a schematic view of an electrical machine, in accordance with various aspects described herein.

As generally illustrated in FIG. 2, an electrical machine 20 can include an induction generator 40, an electrical converter 42, a controller 44 (e.g., an electronic controller), a power storage device 46, a power output 48, and one or more sensors 50. In some configurations, the power storage device 46 can include a battery 60, a capacitor 62, or a battery 60 and a capacitor 62, but can include other configurations and components. The sensors 50 can include one or more electrical characteristic sensors, such as voltage sensors, current sensors, frequency sensors, and speed sensors (e.g., rotor speed sensors, shaft speed sensors), among others. The controller 44 can include a processor 52 and a memory 54, among other components.

The induction generator 40 can be mechanically coupled to the mechanical machine 22 via the rotatable shaft 26 such that operation of the mechanical machine 22 causes rotation of the rotatable shaft 26 and a rotor 70 of the induction generator 40 relative to a stator 72 of the induction generator 40. The rotor 70 can be coupled to or integrated with the rotatable shaft 26 such that rotation of the rotatable shaft 26 causes rotation of the rotor 70. During power-generating operations, rotation of the rotor 70 relative to a stator 72 of the induction generator 40 ultimately induces or generates a generator output current in the stator 72 or windings thereof, and the generator output current is further provided to the power output 48. The generator output current can include a three-phase AC current with a variable frequency. The controller 44 can be connected to the induction generator 40 to control, at least in part, operation of the induction generator 40, which can include an output power thereof. In some examples, the induction generator 40 can include a 4-pole configuration and the rotor 70 can include a squirrel cage configuration. The rotatable shaft 26 and the induction generator 40 may, in some examples, be configured such that during normal/expected operation, the induction generator 40 operates in a field weakening mode.

In some configurations, the controller 44 is configured to control, at least in part, operation of the induction generator 40 to provide power at the power output 48 having one or more electrical characteristics within defined thresholds and to maintain the one or more electrical characteristics within the certain thresholds in response to a constant power draw or power demand, as well as in response to a varying power demand, such as when power demands change. In one non-limiting example, varying power demand or power demand changes can occur in response to increasing the electrical load(s) (e.g., energizing additional loads) or reducing the electrical loads (e.g., de-energizing electrical loads). In yet another non-limiting example, varying power demand or power demand changes can occur in response to changing a state or operation of an existing electrical load (e.g., radar ping demands, "higher" (compared with "lower") heating settings on de-icing units, or the like).

Additionally or alternatively, in some configurations, the controller 44 is configured to control, at least in part, operation of the induction generator 40 to provide power at the power output 48 having one or more electrical characteristics within defined thresholds and to maintain the one or more electrical characteristics within the certain thresholds in response to changes in rotational speed of the rotor 70 of the induction generator 40.

The thresholds can be predetermined. Additionally or alternatively, the thresholds can be determined by the controller 44 according to current operating conditions. The thresholds can include a single value, a set of discrete values, or a continuous range of values. The electrical characteristics can include one or more of current, voltage, and frequency, for example. In some exemplary configurations, the one or more electrical characteristics includes an output voltage and the controller 44 is configured to operate the induction generator 40 to maintain the output voltage, such as within a defined threshold. The output frequency may vary to meet a changed power demand, to compensate for a changed rotor speed, to maintain the output voltage, or a combination thereof. For example, the electrical machine 20 can operate as a constant voltage variable frequency (CVVF) generator. In a non-limiting example, a desired constant output voltage can be 110 VAC to 120 VAC, such as 115 VAC, and the frequency can be 380 Hz to 800 Hz. With some configurations, the controller 44 can control the output power of the induction generator 40 by controlling a frequency of the converter 42 according to a rotational speed of the rotor 70, a power demand of the set of loads 24, one or more electrical characteristics of the power output 48, a DC voltage of the power storage device 46, or a combination thereof.

With some examples, the controller 44 can be connected to one or more sensors 50 to detect variances in the electrical characteristics at the power output 48, in the power demand of the set of loads 24, in the rotational speed of the rotor 70, or a combination thereof. A variance may be defined by a change over a period of time. The controller 44 may compare information from the one or more sensors 50 to desired thresholds to determine if a variance has occurred. For example and without limitation, a variance may include a change in voltage at the power output 48 of up to 20% in less than 1 millisecond. In a non-limiting example, the one or more sensors 50 includes a voltage sensor configured to sense the output voltage at the power output 48, and the controller 44 can compare the sensed voltage to the desired output voltage to determine if a variance is present or has occurred. If a variance is present or has occurred, the controller 44 may operate the converter 42 to compensate for such a variance. The controller 44 may, for example, operate the converter 42 by generating one or more control signals, such as sinusoidal pulse width modulation (SPWM) signals, and providing the one or more control signals to the converter 42.

In some configurations, the controller 44 may control the converter 42 according to one or more of the following, a sensed DC voltage of the power storage device 46, a set DC voltage of the power storage device 46, a sensed speed of a rotor 70 of the induction generator 40, and a sensed output voltage or voltages at the power output 48, among other values. For example, the controller 44 may utilize one or more of these values to generate the one or more control signals. The sensed values can be obtained via respective sensors of the one or more sensors 50 (e.g., voltage sensors, rotor speed sensors, among others), with which the controller 44 can be connected.

According to some aspects of the current disclosure, the converter 42 can be connected to the set of loads 24 in parallel with the induction generator 40. For example, the induction generator 40 and the converter 42 can both be electrically connected to the power output 48. In some examples, the power output 48 can include terminals of the induction generator 40, but can include other configurations. The set of loads 24 and the induction generator 40 can be connected to the power output 48 such that at least some (e.g., a majority) of the output power $P_{IG}$ of the induction generator 40 is provided directly to the set of loads 24 via the power output 48 without being converted by a converter (e.g., converter 42).

Figure 3:
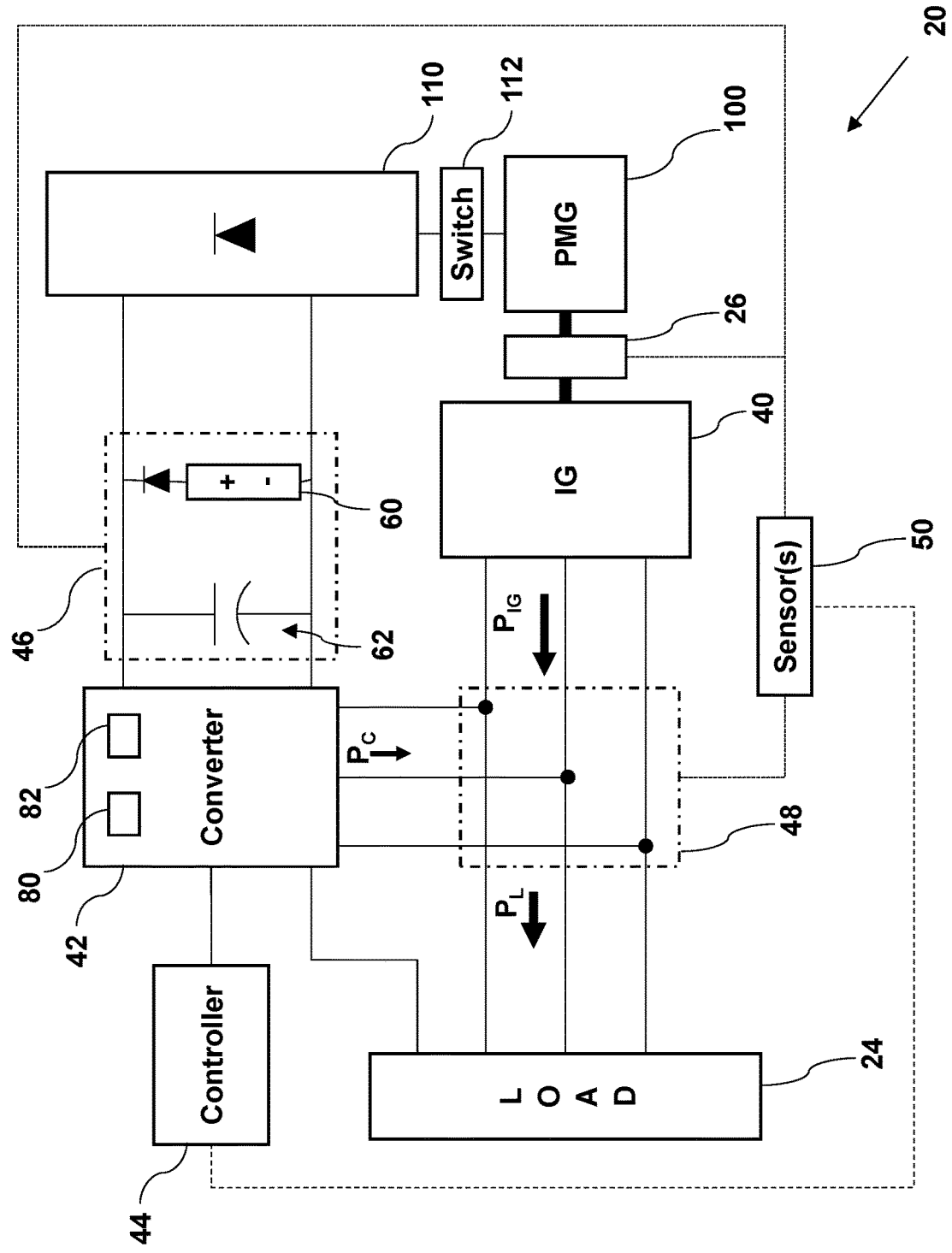
FIG. 3 is a schematic view of an electrical machine, in accordance with various aspects described herein.

The converter 42 includes a first mode, a second mode, and an inactive mode. In the first mode, such as generally illustrated in FIG. 3, the converter 42 is configured to supplement the power $P_{IG}$ provided by the induction generator 40 to the power output 48. Supplementing the induction generator power $P_{IG}$ can include providing supplemental power $P_C$ from the power storage device 46 to the power output 48. In some configurations, the power storage device 46 stores DC power, and supplementing the induction generator power $P_{IG}$ includes the converter 42 converting the DC power from the power storage device 46 to three-phase AC power and providing the three-phase AC power $P_C$ to the power output 48. The combined power $P_L$ of the power $P_C$ from the converter 42 and the power $P_{IG}$ from the induction generator 40 at the power output 48 can then be provided to the set of loads 24.

Figure 4:
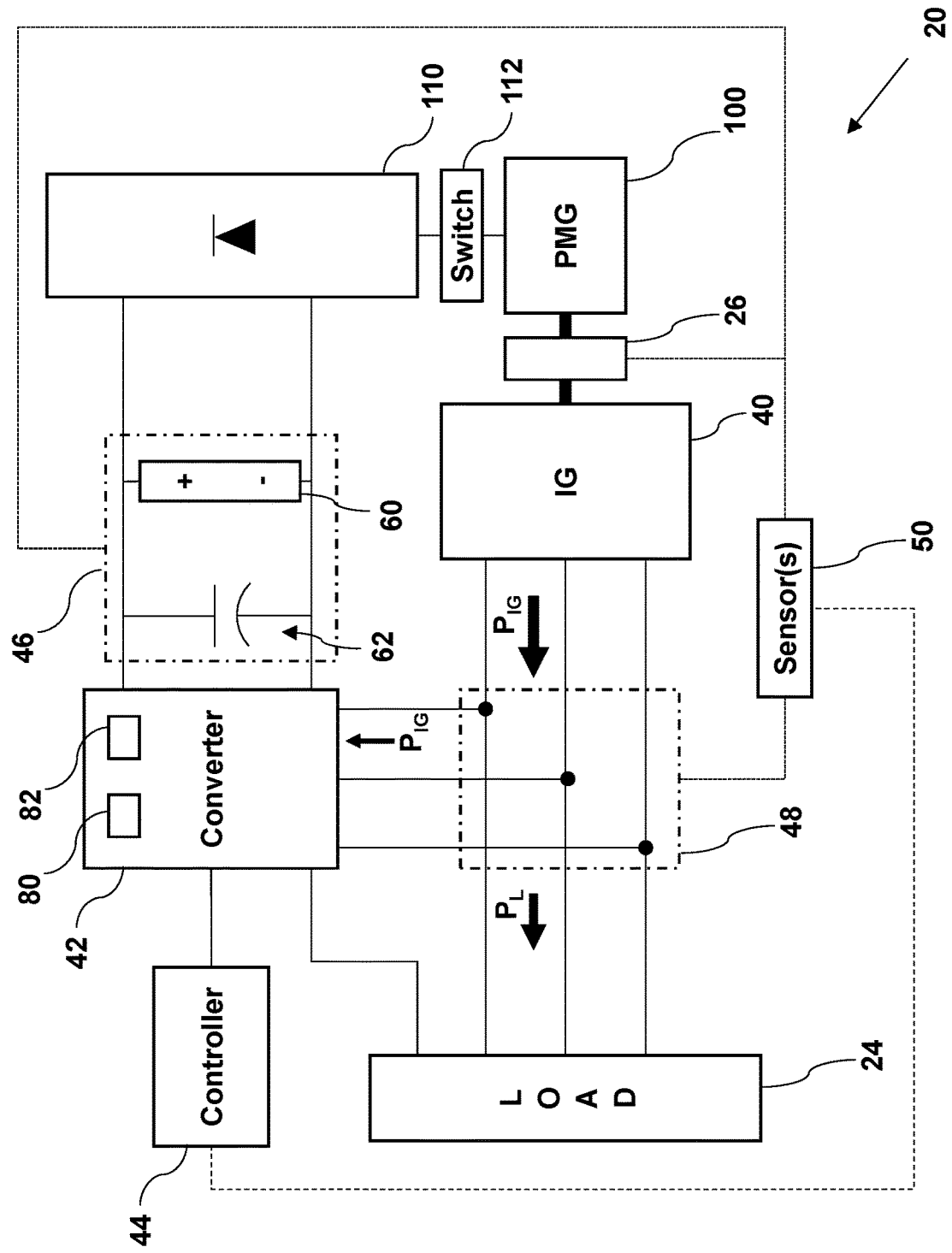
FIG. 4 is a schematic view of an electrical machine, in accordance with various aspects described herein.

In the second mode of the converter 42, such as generally illustrated in FIG. 4, the converter 42 is configured to absorb/store at least a portion of the power $P_{IG}$ generated by the induction generator 40. Absorbing power (e.g., excess power) from the induction generator 40 can include the converter 42 converting a portion of the three-phase AC power $P_{IG}$ from the induction generator 40 to DC power and providing the DC power to the power storage device 46. The output power $P_L$ from the power output 48 may then include the remaining portion of the power $P_{IG}$ from the induction generator 40 and may not include power from the converter 42.

In the inactive mode, the converter 42 may provide reactive power Qc to the power output 48, the induction generator 40, the set of loads 24, or a combination thereof. Additionally or alternatively, in the inactive mode, the converter 42 may absorb/consume some of the power $P_{IG}$ for electronics of the converter 42, electronics of the controller 44, charging the power storage device 46, or a combination thereof.

According to some aspects of the current disclosure, the converter 42 can include a bi-directional 3-phase four wire AC-DC inverter having a filter 80 and can be configured as a solid-state converter (e.g., comprising a plurality of solid-state switches 82).

The converter 42 may provide excitation current to the induction generator 40, which may generate a magnetic field. Rotation of the induction generator rotor 70 in the magnetic field ultimately generates an inducted current in the induction generator stator 72 that can be provided as the induction generator output $P_{IG}$ to the power output 48.

With some aspects, the controller 44 may control operation of the induction generator 40, at least in part, via controlling a frequency of the converter 42. For example, the controller 44 may increase the output power $P_{IG}$ of the induction generator 40 via decreasing the frequency of the converter 42, and the controller 44 may decrease the output power $P_{IG}$ of the induction generator 40 via increasing the frequency of the converter 42. Additionally or alternatively, the controller 44 may control the frequency of the converter 42 according to a rotational speed/frequency of the rotor 70. For example, if frequency of the rotor 70 decreases, the controller 44 may decrease a frequency of the converter 42, and if the frequency of the rotor 70 increases, the controller 44 may increase a frequency of the converter 42. The frequency of the converter 42 may control the frequency at the power output 48. The controller 44 may control the frequency of the converter 42 such that the frequency at the power output 48 is less than the frequency of the rotor 70. The frequency of the shaft 26 and the rotor 70 may be the same if the rotor 70 is fixed to rotate with the shaft 26.

In some configurations, the controller 44 may control the converter 42, at least in part, according to a DC voltage of the power storage device 46, which may be sensed via one or more sensors 50. When the converter 42 operates in the first mode to provide supplemental power, the DC voltage of the power storage device 46 may decrease relative to a set point. When the converter 42 operates in the second mode to absorb power, the DC voltage of the power storage device 46 may increase relative to the set point. The controller 44 may use the difference between the sensed DC voltage and the set point to control the converter 42.

The controller 44 may additionally utilize a frequency of the rotor 70 sensed via one or more sensors 50 to control the converter 42. For example, if the sensed DC voltage is greater than the set point, the controller 44 may operate the converter 42 at a higher frequency relative to the sensed frequency of the rotor 70 such that the difference between the converter frequency and rotor frequency is smaller, but the converter frequency is still less than the rotor frequency. If the sensed DC voltage is less than the set point, the controller 44 may operate the converter 42 at a lower frequency relative to the sensed frequency of the rotor 70 such that the difference between the converter frequency and rotor frequency is greater, with the converter frequency still less than the rotor frequency.

With some examples, the controller 44 can be configured to maintain certain electrical characteristics of the power output 48, such by controlling operation of the induction generator 40, operation of the converter 42, or both. Adjusting operation of the induction generator 40 to adjust the generator output to maintain an electrical characteristic of the power output 48 in response to a changing power demand or a changing rotor frequency may involve a response time or delay, such as due to physical limitations associated with changing parameters of the induction generator 40. The response delay may, for example and without limitation, be on the order of a tens of milliseconds (e.g., 50-80 ms) and may be within certain predefined specifications or standards for various applications. In some instances, it may be desirable to reduce the response delay. The controller 44 can control operation of the converter 42 to at least temporarily compensate for changes in power demand, such as while operation of the induction generator 40 is adjusted. For example, when the power demand increases, the rotor speed decreases, or both, the controller 44 can control the induction generator 40 to increase its output (e.g., decrease the frequency of the converter 42), and while the induction generator 40 is increasing its output, the controller 44 can operate the converter 42 in the first mode to more immediately supplement the output of the induction generator 40 with power from the power storage device 46, such as to maintain a constant voltage output.

Additionally or alternatively, when the power demand decreases, the rotor frequency increases, or both, the controller 44 can control the induction generator 40 to decrease its output (e.g., increase the frequency of the converter 42), and while the induction generator 40 is decreasing its output, the controller 44 can operate the converter 42 in the second mode to absorb excess power at the power output 48 (e.g., from the induction generator 40) and store the absorbed excess power in the power storage device 46, such as to maintain a constant voltage output. As the converter 42 can comprise quick-acting electrical components, such as solid-state switches 82, among others, the converter 42 can start compensating for changes in power demand faster than the induction generator 40 on its own. For example and without limitation, the converter 42 may be configured to fully supplement and absorb excess generator power within one millisecond, which may result in one or more electrical characteristics of the power output 48 being less variable than relying on control of the induction generator 40 alone. Also, excess power generated by the induction generator 40 that may otherwise be wasted can be stored (e.g., "saved") and utilized to power, at least in part, one or more loads of the set of loads 24 when the power demand later increases and the converter 42 operates in the first mode, which may reduce power consumption of the electrical machine 20.

Utilizing the converter 42 to compensate for changing power demands from the set of loads 24 or changes in rotor speed, or both, and variances in electrical characteristics at the power output 48 associated therewith can allow for the induction generator 40 to have a smaller configuration. For example, the induction generator 40 may not need to be sized to quickly accommodate changes in power demand or rotor speed because those changes in power demand can be compensated for, at least temporarily, via the converter 42.

Figure 5:
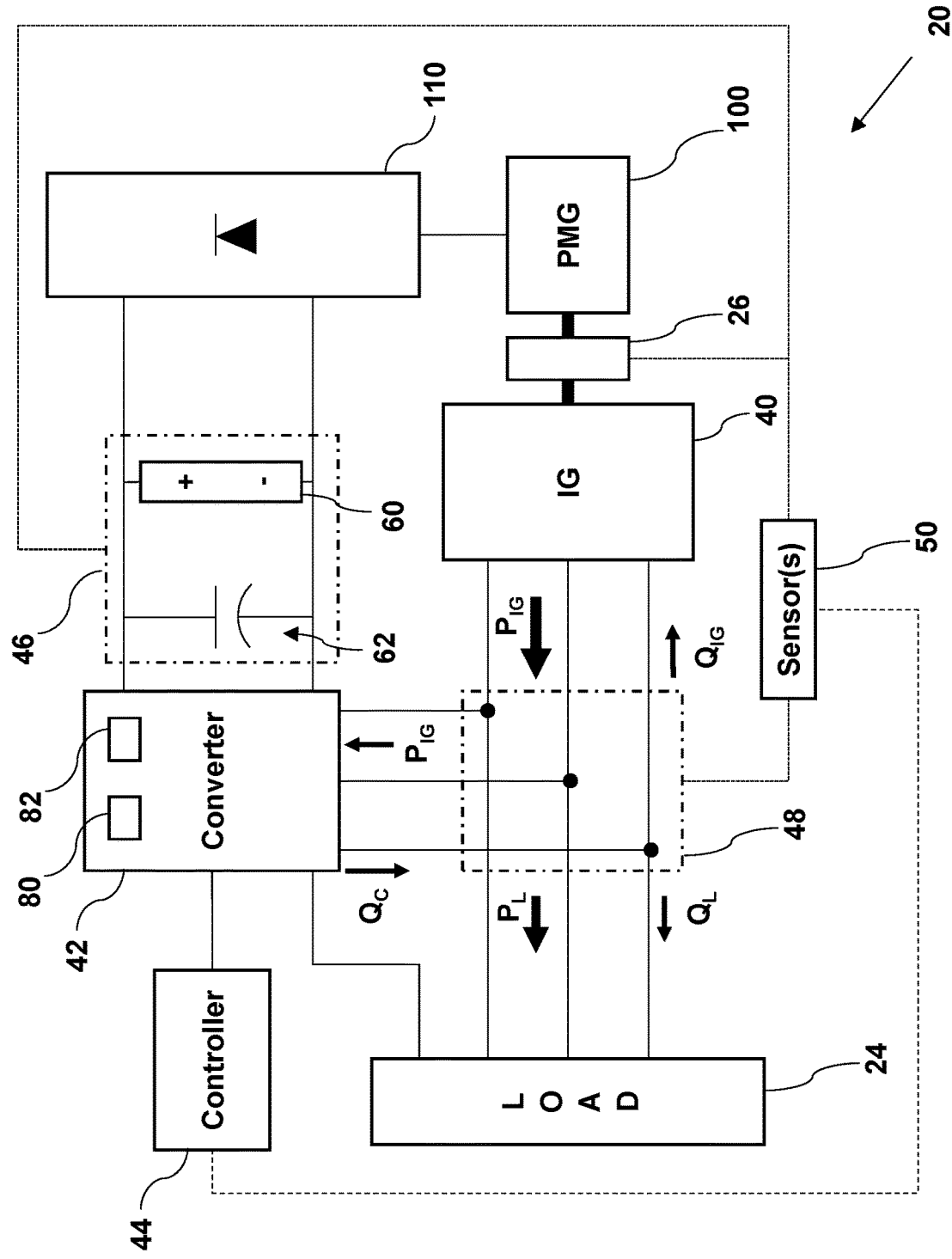
FIG. 5 is a schematic view of an electrical machine, in accordance with various aspects described herein.

Referring to FIG. 5, with some aspects of the present disclosure, the converter 42 can provide reactive power to the induction generator 40, the set of loads 24, or both (e.g., simultaneously). For example, the converter 42 may provide reactive power Qc to both the induction generator 40 (QIG) and the set of loads 24 (QL) at the same time. The converter 42 may provide the reactive power when the converter 42 is in the first mode, when the converter 42 is in the second mode, and when the converter 42 is not in the first or second mode (e.g., in an inactive mode). For example, the converter 42 may provide reactive power Qc to the induction generator 40 (QIG) and the set of loads 24 (QL) when (i) the converter 42 is also providing supplemental power $P_C$ (e.g., active power) to the power output 48, (ii) the converter 42 is absorbing power $P_{IG}$ (e.g., active power) from the induction generator 40, and (iii) when the converter 42 is not providing supplemental active power or absorbing a significant amount of active power (e.g., in an inactive mode of the converter 42). The induction generator 40 and one or more loads of the set of loads 24 may, for example, utilize the reactive power Qc received from the converter 42 to generate magnetic fields.

In some configurations, an electrical machine 20 includes or is connected to a permanent magnet generator (PMG) 100 that includes a PMG rotor 102 and a PMG stator 104 (see, e.g., FIG. 2). The PMG rotor 102 is mechanically coupled to the rotatable shaft 26 and generates a PMG output in the PMG stator 104. The PMG output can be provided to the converter 42, the power storage device 46, or both. Specifically, the rotation of a set of permanent magnets affixed to the PMG rotor 102 relative to the PMG stator 104 can generate current in the PMG stator 104 that is provided to the converter 42, the power storage device 46, or both.

In some configurations, the PMG 100 can be connected to the power storage device 46 via a diode bridge 110 (see, e.g., FIGS. 3-5). The diode bridge 110 may convert an AC output of the PMG 100 to DC current and provide the DC current to the power storage device 46 for storage, to the converter 42, or both.

If the electrical machine 20 includes or is coupled with a PMG 100, an output of the PMG 100 may be utilized during an initial phase/time period of operating the induction generator 40. For example, the converter 42 may utilize the PMG 100, at least indirectly via the power storage device 46, as a power source to provide an initial excitation current to the induction generator 40. Once the induction generator 40, the converter 42, the power storage device 46, or a combination thereof has reached a certain operational threshold (e.g., a steady-state condition, a DC voltage set point of the power storage device 46), the initial phase may end. After the initial phase, power from the PMG 100 may, at least in some configurations, not be used. For example and without limitation, after the initial phase, the controller 44 may electrically disconnect the PMG 100 from the power storage device 46, the converter 42, or both, via opening a switch 112 (see, e.g., FIG. 3). The initial phase may, for example, end when a DC voltage of the power storage device 46 reaches a threshold/set value. The DC voltage may be sensed via one or more sensors 50.

In some examples, the induction generator 40 can be configured as a self-starting induction generator. For example, if the power storage device 46 (e.g., the battery 60) has sufficient power for the converter 42 to provide an initial excitation current to the induction generator 40, the converter 42 may provide the initial excitation current from the power storage device 46 to the induction generator 40 without utilizing a PMG 100 or another external source of power.

Figure 6:
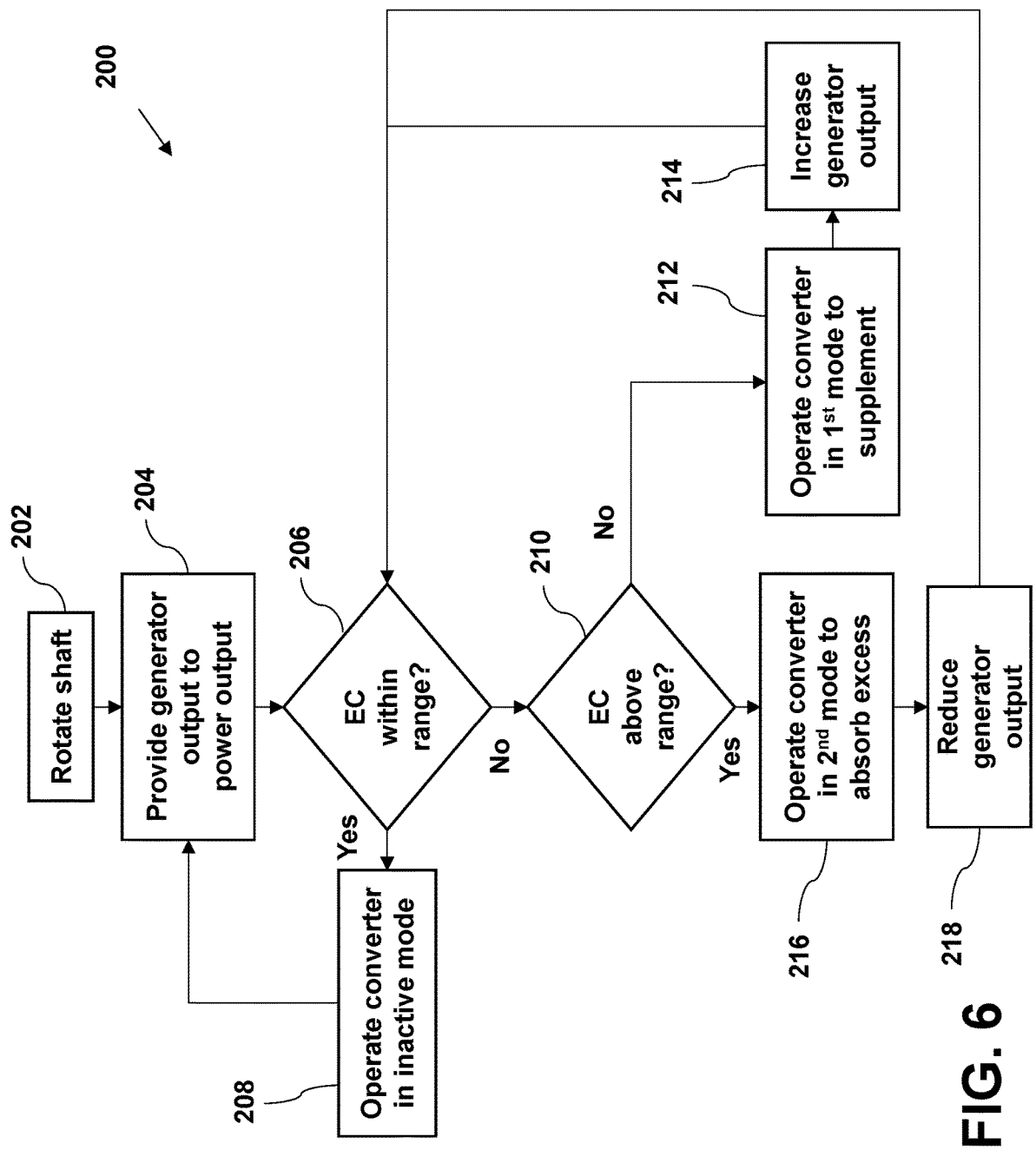
FIG. 6 is a flow diagram of a method of operating an electrical machine, in accordance with various aspects described herein.

Referring to FIG. 6, a method 200 of operating an electrical machine 20 is generally illustrated. The method 200 can include rotating the rotatable shaft 26 (block 202). Rotating the rotatable shaft 26 can include a mechanical machine 22 (e.g., a prime mover, gas turbine engine, among others) that is operably coupled with the rotatable shaft 26 operating to cause rotation of the rotor 70 above a synchronous speed of the induction generator 40. The method 200 can include providing power from the induction generator 40 to a power output 48 (block 204), which may be provided to the set of loads 24. The controller 44 can monitor one or more electrical characteristics to determine if the one or more electrical characteristics are within respective thresholds and if any variances are present (block 206), such as via one or more sensors 50.

If the one or more electrical characteristics are within the thresholds, the method 200 may include the controller 44 operating the converter 42 in an inactive mode (block 210), which can include maintaining the converter 42 in the inactive mode, switching the converter 42 to the inactive mode, or both. Additionally or alternatively, the method 200 may return to block 204 or may continue to monitor the one or more electrical characteristics (block 206). Operating the converter 42 in the inactive mode (block 210) can include the converter 42 providing reactive power Qc to the power output 48, the induction generator 40, the set of loads 24, or a combination thereof. Additionally or alternatively, operating the converter 42 in the inactive mode (block 210) can include the converter 42 consuming some of the power $P_{IG}$ to power electronics of the converter 42.

With some aspects of the present disclosure, if the controller 44 determines the one or more electrical characteristics are not within the thresholds or variances are present (block 206), the method 200 may include the controller 44 determining if the one or more electrical characteristics are above the thresholds (block 210), which may include, at least indirectly, determining if the electrical characteristics are below the thresholds.

If the controller 44 determines the one or more electrical characteristics are not above the thresholds, the controller 44 may operate the converter 42 in a first mode (block 212), such as to supplement the power provided by the induction generator 40. For example, the controller 44 may operate the converter 42 as a DC-AC converter to convert DC power stored in the power storage device 46 to AC power and provide that AC power to the power output 48 as supplemental power $P_C$ that supplements the power $P_{IG}$ provided by the induction generator 40. The method 200 can also include the controller 44 adjusting operation of the induction generator 40 to increase the output power $P_{IG}$ of the induction generator 40 (block 214). The controller 44 may, for example, increase the output power $P_{IG}$ of the induction generator 40 (block 214) by decreasing the frequency of the converter 42 (e.g., farther below a frequency of the rotor 70). The controller 44 may decrease the frequency of the converter 42 according to a sensed DC voltage of the power storage device 46, a frequency of the rotor 70, the voltage at the power output 48, or a combination thereof. While shown as separate and sequential blocks 212, 214, the controller 44 may conduct blocks 212, 214 simultaneously. Additionally, the controller 44 may reduce the amount of supplemental power $P_C$ provided via the converter 42 as the output of the induction generator 40 increases. The controller 44 may continue to monitor the one or more electrical characteristics (e.g., in block 206, block 210, or both) and continue to operate the converter 42 in the first mode until the one or more electrical characteristics are within the thresholds, at which point the controller 44 may operate the converter 42 in an inactive mode (block 208). In the inactive mode, the converter 42 may not provide or absorb a significant amount of active power, but can provide reactive power Qc to the induction generator 40, the set of loads 24, or both. Additionally or alternatively, in the inactive mode, the converter 42 may absorb some power for electronics of the converter 42, for electronics of the controller 44, for charging the power storage device 46, or a combination thereof.

In some aspects, if the controller 44 determines that the one or more electrical characteristics are above the thresholds (block 210), the controller 44 may operate the converter 42 in a second mode (block 216), such as to absorb excess power $P_{IG}$ provided by the induction generator 40. For example, the controller 44 may operate the converter 42 as an AC-DC converter to convert AC power $P_{IG}$ from the induction generator 40 to DC power and provide that DC power to the power storage device 46 for storage. The method 200 can also include the controller 44 adjusting operation of the induction generator 40 to decrease the output power $P_{IG}$ of the induction generator 40 (block 218). The controller 44 may, for example, decrease the output power $P_{IG}$ of the induction generator 40 (block 218) by increasing the frequency of the converter 42 (e.g., closer to a frequency of the rotor 70). The controller 44 may increase the frequency of the converter 42 according to a sensed DC voltage of the power storage device 46, a frequency of the rotor 70, the voltage at the power output 48, or a combination thereof. While shown as separate and sequential blocks 216, 218, the controller 44 may conduct blocks 216, 218 simultaneously. Additionally, the controller 44 may reduce the amount of power absorbed by the converter 42 as the output of the induction generator 40 decreases. The controller 44 may continue to monitor the one or more electrical characteristics (e.g., in block 206, block 210, or both) and continue to operate the converter 42 in the second mode until the one or more electrical characteristics are within the thresholds, at which point the controller 44 may operate the converter 42 in the inactive mode (block 208).

In some examples, the controller 44 is configured to maintain one or more electrical characteristics at the power output 48, at least in part, via selectively operating the converter 42 in (i) a first mode to provide supplemental power $P_C$ to the power output 48 from a power storage device 46, and (ii) a second mode to absorb a portion of the power $P_{IG}$ from the power output 48/induction generator 40. With some aspects, the one or more electrical characteristics can include a load voltage. Maintaining the electrical characteristic can include, in accordance with the controller 44 determining that the load voltage is below a threshold, increasing the load voltage via the controller 44 operating the converter 42 in the first mode to convert a first DC current from the power storage device 46 to a first AC current and providing the first AC current to the power output 48 to supplement a second AC current from the induction generator 40. Additionally or alternatively, maintaining the electrical characteristic can include, in accordance with the controller 44 determining that the load voltage is above a threshold, decreasing the load voltage via the controller 44 operating the converter 42 in the second mode to convert a portion of the second AC current to a second DC current and providing the second DC current to the power storage device 46.

The set of electrical loads 24 can represent distinct or individual electrical loads with varying electrical characteristics or power demands. One or more loads of the set of electrical loads 24 can be enabled and disabled during operation of the electrical machine 20, and one or more loads of the electrical loads 24 can be operated in different modes, both of which can result in varying power demands for the electrical machine 20. For example, a subset of the set of electrical loads 24 can include electrical loads that are selectively enabled for a limited portion of the operation of the electrical machine 20, such as, for example, during a limited portion of a flight (e.g., takeoff or landing operations, or particular operations). With aircraft applications, the set of electrical loads 24 can, for example, include an actuator load, flight critical loads, and non-flight critical loads. For aircraft applications, the set of electrical loads 24 can be located anywhere inside the aircraft 30. The set of electrical loads 24 can include balanced, unbalanced, and non-linear loads.

While examples are described with reference to 3-phase output power of the induction generator 40 and the converter 42 having a three-phase configuration, other examples can include single phase configurations.

If the rotor 70 rotates below a synchronous speed of the induction generator 40, the induction generator 40 may not provide output power and may operate, at least to some degree, as a motor. If the rotor 70 rotates above the synchronous speed of the induction generator 40, the induction generator 40 can generate electrical power. With some aspects of the current disclosure, the converter 42 can switch between operating in the first mode and the second mode while the induction generator 40 operates in a generator mode. When the induction generator 40 operates in a generator mode and the converter 42 is operating in the first mode or the second mode, the induction generator 40 may, in some examples, also be operating in a field weaking mode or region. In some configurations, the converter 42 may not operate in either the first mode or the second mode if the induction generator 40 is in a motor mode.

With some aspects of the present disclosure, the converter 42 is configured to provide and absorb (e.g., temporarily) a relatively small amount of the total output power $P_L$ of the electrical machine 20. For example and without limitation, the converter 42 configured to provide supplemental power or absorb excess power of 20% or less of the total output power $P_L$, 5% or less of the total output power $P_L$, 1% or less of the total output power $P_L$, or other percentages. In a non-limiting example, a converter 42 may provide and absorb a maximum of 20 kW if a maximum output power $P_L$ is 100 KW. The maximum output power $P_L$ may correspond to a power rating of the induction generator 40.

With some example configurations, the induction generator 40 can be configured for operating speeds of 35,000 RPMs or greater. Additionally or alternatively, the induction generator 40 can be configured, in at least some examples, to provide an output power of at least 50 kW, at least 100 KW, at least 150 KW, or other values.

In some configurations, an electrical machine 20 may not include a rectifier coupled to the rotor 70 of the induction generator 40 or coupled to the rotatable shaft 26, which can reduce complexity of the electrical machine 20 relative to other designs. With other designs, such as designs with synchronous generators (e.g., wound field synchronous generators), a rectifier and other electronics may be attached to a rotor or shaft and be utilized to provide excitation current to the rotor of a generator, which may not be applicable to aspects of the current disclosure. For example, the electrical machine 20 can be configured as a two-stage design, with the induction generator 40 as a first stage and a PMG 100 as a second stage, and may not include a third stage, such as an exciter. Instead, the converter 42 may act as an exciter.

It will be understood that while aspects of the disclosure are shown in an aircraft environment, the disclosure is not so limited and can have applicability in a variety of environments.

It will be understood that the drawings illustrate one non-limiting examples of electrical machines 20 and portions thereof, and additional components, such as power distribution nodes, converters, power protection components, and the like, can be included in the electrical machine 20, but are not shown or described, for brevity.

While terms indicating a single value, (e.g., "a voltage" or "a current") are described, non-limiting aspects of the first set of electrical characteristics or the second set of electrical characteristics can include limited or bounded ranges (e.g., a voltage range, a current range, a ripple range, a power output range, etc.).

The sequences described in this disclosure are for understanding purposes only and is not meant to limit aspects of the disclosure or the applicable methods of applying aspects of the disclosure in any way as it is understood that the portions of the method can proceed in a different logical order, additional or intervening portions can be included, or described portions of the method can be divided into multiple portions, or described portions of the method can be omitted without detracting from the described method.

Many other possible aspects and configurations in addition to that shown in the above figures are contemplated by the present disclosure. Aspects disclosed herein include an electrical machine with an induction generator and a converter in parallel, and the induction generator can switch between absorbing and supplementing the output of the induction generator output to compensate for changing power demands. The technical effect is that the above-described aspects enable faster responses to changing power demands via solid-state components of the converter.

To the extent not already described, the different features and structures of the various aspects can be used in combination with each other as desired. That one feature is not illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

The various features of the different aspects can be mixed and matched as desired to form new aspects, whether or not the new aspects are expressly described. Combinations or permutations of features described herein are covered by this disclosure. Further aspects of the disclosure are provided by the subject matter of the following clauses:

An electrical machine, comprising: a rotatable shaft; an induction generator mechanically coupled to the rotatable shaft and defining a power output connectable with an electrical load, wherein the power output defines a desired constant voltage output; a converter electrically connected with the power output; and a controller connected to the converter, the controller configured to, in response to determining a variance from the desired constant voltage output, at least one of provide supplemental power at the power output to raise the power output to the desired constant voltage output or absorb excess power at the power output to lower the power output to the desired constant voltage output.

The electrical machine of any preceding clause, wherein the converter is configured to provide 20% or less of a total amount of power expected to be consumed by the electrical load.

The electrical machine of any preceding clause, wherein an output frequency of the power output is 380 Hz to 800 Hz.

The electrical machine of any preceding clause, wherein the converter comprises a bidirectional 3-phase AC-DC solid-state converter configured to respond to the variance in less than 1 millisecond.

The electrical machine of any preceding clause, further comprising a rotor speed sensor configured to sense a rotor speed of the induction generator; wherein the controller is connected to the rotor speed sensor and is configured to modify an output frequency of the induction generator according, at least in part, to changes in the rotor speed.

The electrical machine of any preceding clause, further comprising a power storage device electrically connected to the converter, the power storage device including a battery, a capacitor, or a battery and a capacitor.

The electrical machine of any preceding clause, further comprising a permanent magnet generator (PMG) mechanically coupled to the rotatable shaft and electrically connected to the induction generator and the power storage device.

The electrical machine of any preceding clause, wherein the rotatable shaft is not coupled with a rectifier.

An aircraft, comprising: the electrical machine of any preceding clause; and a gas turbine engine; wherein the gas turbine engine is mechanically coupled to the rotatable shaft.

An electrical machine, comprising: a rotatable shaft; an induction generator mechanically coupled to the rotatable shaft and defining a power output connectable with an electrical load, wherein the power output defines a desired constant voltage output; a converter electrically connected with the power output; and a controller connected to the converter, the controller configured to maintain the desired constant output voltage via operating the converter in (i) a first mode to provide, from a power storage device, supplemental power at the power output, and (ii) a second mode to absorb excess power at the power output.

The electrical machine of any preceding clause, wherein the converter comprises a solid-state power converter.

The electrical machine of any preceding clause, wherein the converter, when in the second mode, is configured to store the absorbed power in the power storage device.

The electrical machine of any preceding clause, wherein the controller operates the converter in the first mode in response to an increase in power demand at the power output, a decrease in rotational speed of the rotatable shaft, or a combination of the increase in power demand and the decrease in rotational speed; and the controller operates the converter in the second mode in response to a decrease in power demand at the power output, an increase in rotational speed of the rotatable shaft, or a combination of the decrease in power demand and the increase in rotational speed.

The electrical machine of any preceding clause, wherein the controller is configured to simultaneously provide reactive power from the electrical converter to (i) a load connected to the power output and (ii) the induction generator, when the electrical converter is in the first mode and when the electrical converter is in the second mode.

An aircraft, comprising: the electrical machine of any preceding clause; and a gas turbine engine; wherein the gas turbine engine is mechanically coupled to the rotatable shaft.

A method of operating the electrical machine of any preceding clause, the method comprising: rotating the shaft above a synchronous speed of the induction generator; providing current from an output of the induction generator to the power output; and maintaining an electrical characteristic at the power output via the controller selectively operating an electrical converter in (i) a first mode to provide supplemental power to the power output from a power storage device, and (ii) a second mode to absorb power from the power output.

A method of operating an electrical machine, the method comprising: rotating a shaft coupled with an induction generator above a synchronous speed of the induction generator; providing current from an output of the induction generator to a power output; and maintaining an electrical characteristic at the power output via a controller selectively operating an electrical converter in (i) a first mode to provide supplemental power to the power output from a power storage device, and (ii) a second mode to absorb power from the power output.

The method of any preceding clause, wherein the electrical characteristic includes a load voltage; wherein maintaining the electrical characteristic includes, in accordance with determining that the load voltage is below a threshold, increasing the load voltage via the controller operating the electrical converter in the first mode to convert a first DC current from the power storage device to a first AC current and providing the first AC current to the power output to supplement a second AC current from the induction generator; and wherein maintaining the electrical characteristic includes, in accordance with determining that the load voltage is above the threshold, decreasing the load voltage via the controller operating the electrical converter in the second mode to convert a portion of the second AC current to a second DC current and providing the second DC current to the power storage device.

The method of any preceding clause, wherein maintaining the electrical characteristic includes varying an output frequency of the induction generator while maintaining a load voltage.

The method of any preceding clause, wherein maintaining the electrical characteristic includes varying an output frequency of the induction generator, according to a change in a rotational speed of the shaft, while maintaining a load voltage.

The method of any preceding clause, further comprising, during an initial phase, operating a permanent magnet generator (PMG) to provide power to the electrical converter; and electrically disconnecting the PMG from the electrical converter after the initial phase; wherein the PMG is coupled with the shaft.

The method of any preceding clause, wherein the induction generator operates in a generator mode when (i) the electrical converter operates in the first mode, and (ii) the electrical converter operates in the second mode.

The method of any preceding clause, further comprising simultaneously providing reactive power from the electrical converter to (i) a load connected to the power output and (ii) the induction generator when the electrical converter is in the first mode and when the electrical converter is in the second mode.

What is claimed is:

1. An electrical machine, comprising:
a rotatable shaft;
an induction generator mechanically coupled to the rotatable shaft and defining a power output connectable with an electrical load, wherein the power output defines a desired constant voltage output;
a converter electrically connected with the power output;
a power storage device electrically connected to the converter, the power storage device including a battery, a capacitor, or a battery and a capacitor;
a permanent magnet generator (PMG) mechanically coupled to the rotatable shaft and electrically connected to the induction generator and the power storage device; and
a controller connected to the converter, the controller configured to:
cause the PMG, at least indirectly via the power storage device, to provide an initial excitation current to the induction generator during an initial phase of operating the induction generator;
in response to determining a variance from the desired constant voltage output, at least one of provide supplemental power at the power output to raise the power output to the desired constant voltage output or absorb excess power at the power output to lower the power output to the desired constant voltage output; and
electronically disconnect the PMG from at least one of the power storage device or the convertor after the initial phase.

2. The electrical machine of claim 1, wherein the converter is configured to provide 20% or less of a total amount of power expected to be consumed by the electrical load.

3. The electrical machine of claim 1, wherein an output frequency of the power output is 380 Hz to 800 Hz.

4. The electrical machine of claim 1, wherein the converter comprises a bidirectional 3-phase AC-DC solid-state converter configured to respond to the variance in less than 1 millisecond.

5. The electrical machine of claim 1, further comprising a rotor speed sensor configured to sense a rotor speed of the induction generator;
wherein the controller is connected to the rotor speed sensor and is configured to modify an output frequency of the induction generator according, at least in part, to changes in the rotor speed.

6. The electrical machine of claim 1, wherein the rotatable shaft is not coupled with a rectifier.

7. An aircraft, comprising:
the electrical machine of claim 1; and
a gas turbine engine;
wherein the gas turbine engine is mechanically coupled to the rotatable shaft.

8. An electrical machine, comprising:
a rotatable shaft;
an induction generator mechanically coupled to the rotatable shaft and defining a power output connectable with an electrical load, wherein the power output defines a desired constant voltage output;
a converter electrically connected with the power output;
a power storage device electrically connected to the converter, the power storage device including a battery, a capacitor, or a battery and a capacitor;
a permanent magnet generator (PMG) mechanically coupled to the rotatable shaft and electrically connected to the induction generator and the power storage device; and a controller connected to the converter, the controller configured to:
  cause the PMG, at least indirectly via the power storage device, to provide an initial excitation current to the induction generator during an initial phase of operating the induction generator;
  maintain the desired constant output voltage via operating the converter in (i) a first mode to provide, from the power storage device, supplemental power at the power output, and (ii) a second mode to absorb excess power at the power output; and
  to electronically disconnect the PMG from at least one of the power storage device or the convertor after the initial phase.

9. The electrical machine of claim 8, wherein the converter comprises a solid-state power converter.

10. The electrical machine of claim 8, wherein the converter, when in the second mode, is configured to store the absorbed power in the power storage device.

11. The electrical machine of claim 8, wherein the controller operates the converter in the first mode in response to an increase in power demand at the power output, a decrease in rotational speed of the rotatable shaft, or a combination of the increase in power demand and the decrease in rotational speed; and
  the controller operates the converter in the second mode in response to a decrease in power demand at the power output, an increase in rotational speed of the rotatable shaft, or a combination of the decrease in power demand and the increase in rotational speed.

12. A method of operating an electrical machine, the method comprising:
  rotating a shaft coupled with an induction generator above a synchronous speed of the induction generator;
  providing current from an output of the induction generator to a power output;
  maintaining an electrical characteristic at the power output via a controller selectively operating an electrical converter in (i) a first mode to provide supplemental power to the power output from a power storage device, and (ii) a second mode to absorb power from the power output;
  operating a permanent magnet generator (PMG) to provide power to the electrical convertor during an initial phase, the permanent magnet generator being coupled to the shaft; and
  electrically disconnecting the PMG from the electrical converter after the initial phase.

13. The method of claim 12, wherein the electrical characteristic includes a load voltage;
  wherein maintaining the electrical characteristic includes, in accordance with determining that the load voltage is below a threshold, increasing the load voltage via the controller operating the electrical converter in the first mode to convert a first DC current from the power storage device to a first AC current and providing the first AC current to the power output to supplement a second AC current from the induction generator; and
  wherein maintaining the electrical characteristic includes, in accordance with determining that the load voltage is above the threshold, decreasing the load voltage via the controller operating the electrical converter in the second mode to convert a portion of the second AC current to a second DC current and providing the second DC current to the power storage device.

14. The method of claim 13, wherein the induction generator operates in a generator mode when (i) the electrical converter operates in the first mode, and (ii) the electrical converter operates in the second mode.

15. The method of claim 12, wherein maintaining the electrical characteristic includes varying an output frequency of the induction generator while maintaining a load voltage.

16. The method of claim 12, wherein maintaining the electrical characteristic includes varying an output frequency of the induction generator, according to a change in a rotational speed of the shaft, while maintaining a load voltage.

17. The method of claim 12, further comprising simultaneously providing reactive power from the electrical converter to (i) a load connected to the power output and (ii) the induction generator when the electrical converter is in the first mode and when the electrical converter is in the second mode.

18. The electrical machine of claim 1, wherein the initial phase ends in response to a DC voltage of the power storage device reaching a threshold value.

19. The electrical machine of claim 8, wherein the initial phase ends in response to a DC voltage of the power storage device reaching a threshold value.

\* \* \* \* \*